(12) United States Patent
Angoli et al.

(10) Patent No.: US 8,704,082 B2
(45) Date of Patent: Apr. 22, 2014

(54) SOLAR ENERGY COLLECTION SYSTEM

(75) Inventors: Roberto Angoli, Chiari (IT); Paolo Parma, Chiari (IT); Alfredo Ronconi, Concesio (IT)

(73) Assignee: R.E.M. S.p.A. Revolution Energy Maker, Brescia (IT)

( * ) Notice: Subject to any disclaimer, the term of this patent is extended or adjusted under 35 U.S.C. 154(b) by 129 days.

(21) Appl. No.: 13/254,272

(22) PCT Filed: Mar. 10, 2010

(86) PCT No.: PCT/IB2010/000497
§ 371 (c)(1),
(2), (4) Date: Sep. 1, 2011

(87) PCT Pub. No.: WO2010/103378
PCT Pub. Date: Sep. 16, 2010

(65) Prior Publication Data
US 2011/0315197 A1 Dec. 29, 2011

(30) Foreign Application Priority Data
Mar. 10, 2009 (IT) .............................. BG2009A0008

(51) Int. Cl.
*H02N 6/00* (2006.01)
*H01L 31/042* (2006.01)

(52) U.S. Cl.
USPC ......................................................... 136/246

(58) Field of Classification Search
CPC .................................................... H01L 31/0422
USPC ........................................ 136/244, 245, 246
See application file for complete search history.

(56) References Cited

U.S. PATENT DOCUMENTS

| | | | | |
|---|---|---|---|---|
| 4,367,365 A | * | 1/1983 | Spencer | 136/244 |
| 5,125,608 A | * | 6/1992 | McMaster et al. | 248/163.1 |
| 6,848,442 B2 | * | 2/2005 | Haber | 126/600 |
| 2006/0044511 A1 | | 3/2006 | Mackamul | |
| 2008/0163921 A1 | | 7/2008 | Leong et al. | |
| 2008/0308091 A1 | | 12/2008 | Corio | |

FOREIGN PATENT DOCUMENTS

| | | |
|---|---|---|
| DE | 102006010162 | 9/2007 |
| UA | 59556 A | 9/2003 |
| WO | 0155651 | 8/2001 |

* cited by examiner

*Primary Examiner* — Eli Mekhlin
(74) *Attorney, Agent, or Firm* — King & Schickli, PLLC

(57) ABSTRACT

A solar energy collection system comprising a solar tracker characterised by comprising a main horizontal load-bearing tube able to rotate about its axis; a plurality of secondary tubes fixed in a manner movable perpendicularly to said main tube and able to rotate about their axis; to each of said secondary tubes there being fixed a panel able to capture solar energy; a support structure comprising a first post and a second post positioned vertically; said first post and said second post each comprising a connection element positioned at their top, for securing said main tube at its ends; said connection element comprising a first lateral portion for fixing said main tube and a second lateral portion for fixing a possible further main tube; said main tube comprising a slidable joint enabling it to expand, said slidable joint being fixed at one end to said main tube and at the other end to said first lateral portion; said first post and said second post comprising a coupling point at their base; said coupling point being fixed to the ground by a screw shaft; each of said first post and said second post being maintained in a vertical position by at least two cables fixed to the ground; said at least two cables being fixed to the ground by screw shafts.

8 Claims, 5 Drawing Sheets

SOLAR ENERGY COLLECTION SYSTEM

This application is the national stage of PCT/IB2010/000497, filed Mar. 10, 2010, which claims priority from Italian Application No. BG2009A000008, filed Mar. 10, 2009, the full disclosures of which are incorporated herein by reference.

FIELD OF THE INVENTION

The present invention relates to a solar energy collection system, in particular a photovoltaic plant comprising a two-axis solar tracker able to maintain photovoltaic panels or other solar energy collection devices correctly orientated towards the sun.

BACKGROUND OF THE INVENTION

A photovoltaic plant is an electrical plant which utilizes solar energy to produce electrical energy by a photovoltaic effect.

A solar tracker is an automatically controlled device able to favourably orientate a photovoltaic panel, a thermal solar panel or a solar concentrator towards the sun's rays. The more sophisticated solar trackers have two degrees of freedom by which they perfectly align a perpendicular line from the photovoltaic panels to the sun's rays in real time.

Solar trackers are known consisting of a rod supporting one or more solar panels. These solar panels are driven by actuators which enable them to orientate towards the sun.

In certain cases, when a high level of electrical energy is to be produced, these solar panels have dimensions which can reach beyond 100 $m^2$.

This requires a robust support rod and a large base as the system must be able to resist severe climatic conditions and in particular resist wind force. This results in a considerable structure weight, a considerable base size and an installation which requires time and specialized labour.

Moreover if these solar trackers are positioned on an agricultural surface, this surface places severe restrictions on the working of the land, represented by obstacles positioned close to the land to limit wind action.

SUMMARY OF THE INVENTION

An object of the present invention is to provide a suspended solar energy collection system which enables total working of the land below.

Another object is to provide a two-axis solar tracker which is of simple conception.

Another object is to provide a system which is simple to install and remove.

A further object is to provide a modular structure.

These and other objects are attained according to the present invention by a solar energy collection system comprising a solar tracker characterised by comprising a main horizontal load-bearing tube able to rotate about its axis; a plurality of secondary tubes fixed in a manner movable perpendicularly to said main tube and able to rotate about their axis; to each of said secondary tubes there being fixed a panel able to capture solar energy; a support structure comprising a first post and a second post positioned vertically; said first post and said second post each comprising a connection element positioned at their top, for securing said main tube at its ends; said connection element comprising a first lateral portion for fixing said main tube and a second lateral portion for fixing a possible further main tube; said main tube comprising a slidable joint enabling it to expand, said slidable joint being fixed at one end to said main tube and at the other end to said first lateral portion; said first post and said second post comprising a coupling point at their base; said coupling point being fixed to the ground by a screw shaft; each of said first post and said second post being maintained in a vertical position by at least two cables fixed to the ground; said at least two cables being fixed to the ground by screw shafts.

Further characteristics of the invention are described in the dependent claims.

With the present invention large plants can be provided on agricultural surfaces while maintaining the land usable for its primary purpose of crop cultivation.

This is achieved by positioning the solar panels at a certain height from the ground, without however using critical load-bearing structures. The solution uses very thin posts of about 5 m in height, maintained in position by ties. The fixing foundations for the posts and ties are also reduced to screw shafts, leaving as much space as possible for crops.

In this manner rows of posts are formed on the ground having a passage space between the panels of about 4.5 m. This ensures total workability of the underlying land for circulating agricultural machines or, if this structure is formed on roadways, perfect practicability for road vehicles.

BREIF DESCRIPTION OF THE DRAWING FIGURES

The characteristics and advantages of the present invention will be apparent from the ensuing detailed description of one embodiment thereof, illustrated by way of non-limiting example in the accompanying drawings, in which.

DETAILED DESCRIPTION OF THE INVENTION

Figure 1:
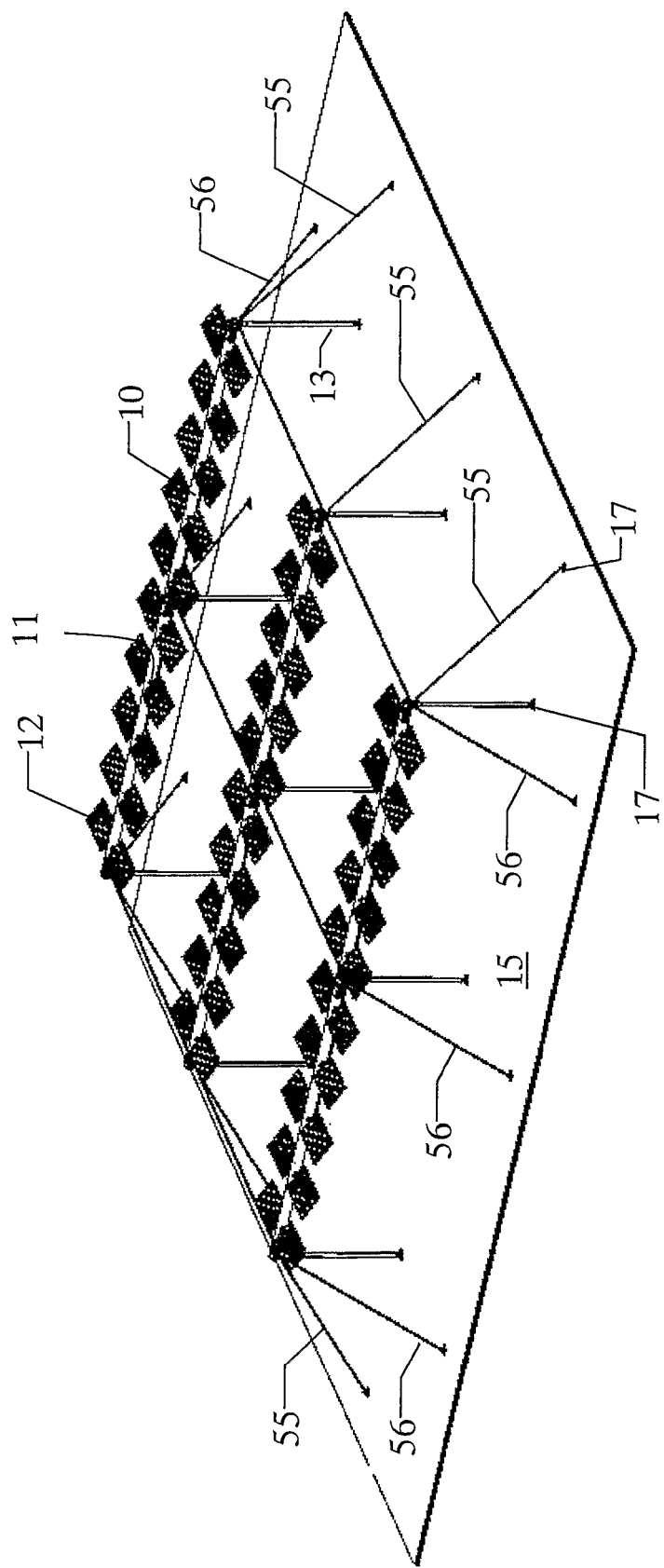
FIG. 1 shows a solar energy collection system according to the present invention.
Figure 2:
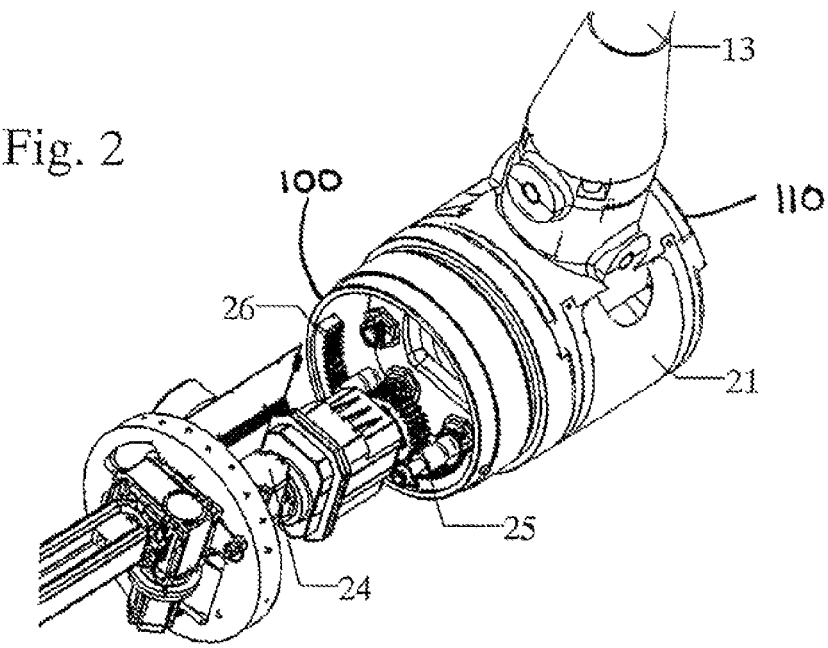
FIG. 2 is a partially transparent more detailed view of a first motorization for the solar energy collection system, according to the present invention.
Figure 3:
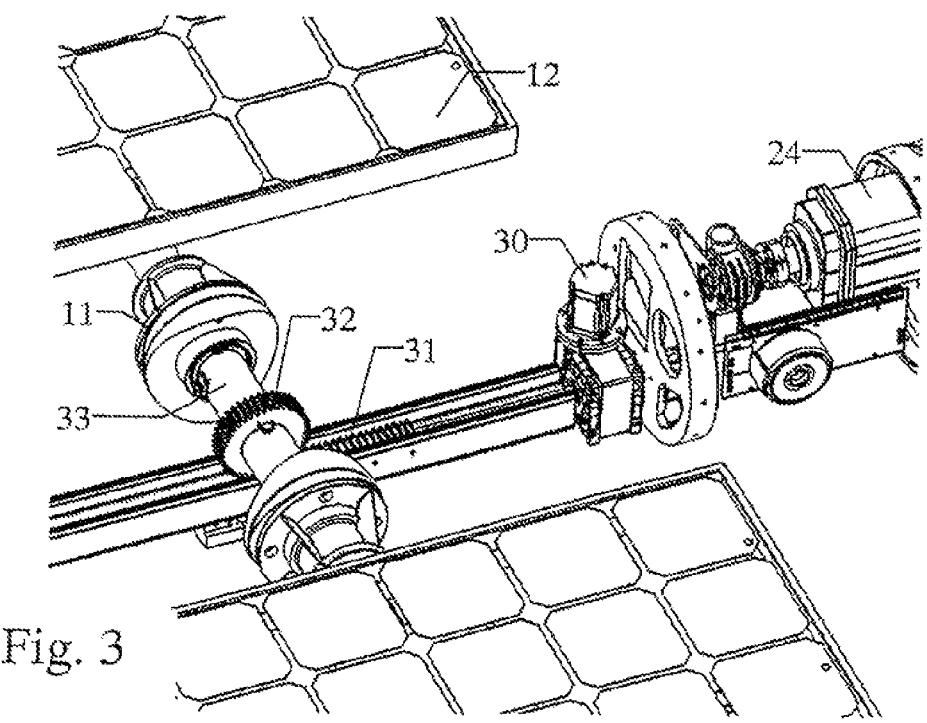
FIG. 3 is a partially transparent more detailed view of a second motorization for the solar energy collection system, according to the present invention.
Figure 4:
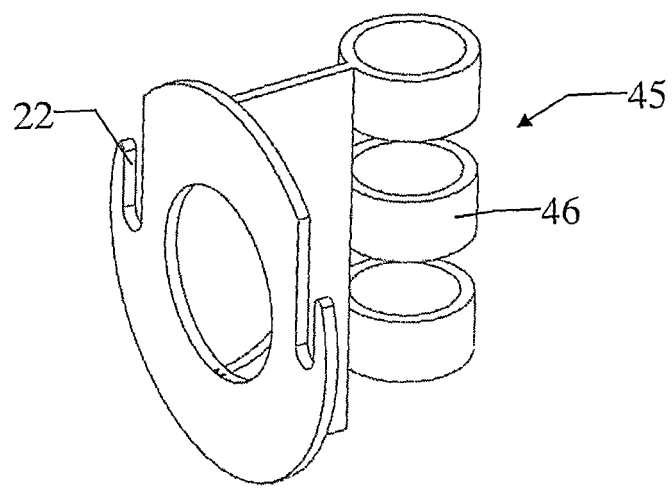
FIGS. 4 and 5 show further embodiments of the couplings for fixing the main tube to the support poles, according to the present invention.
Figure 5:
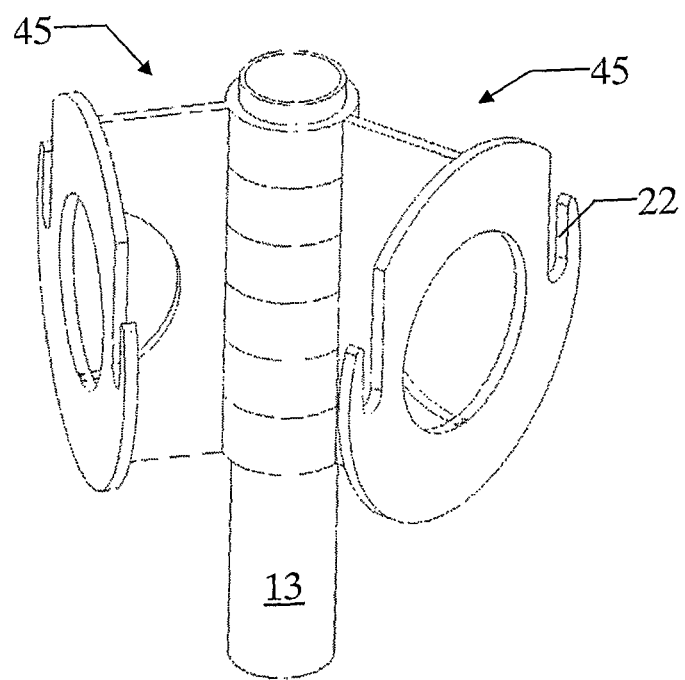
Figure 6:
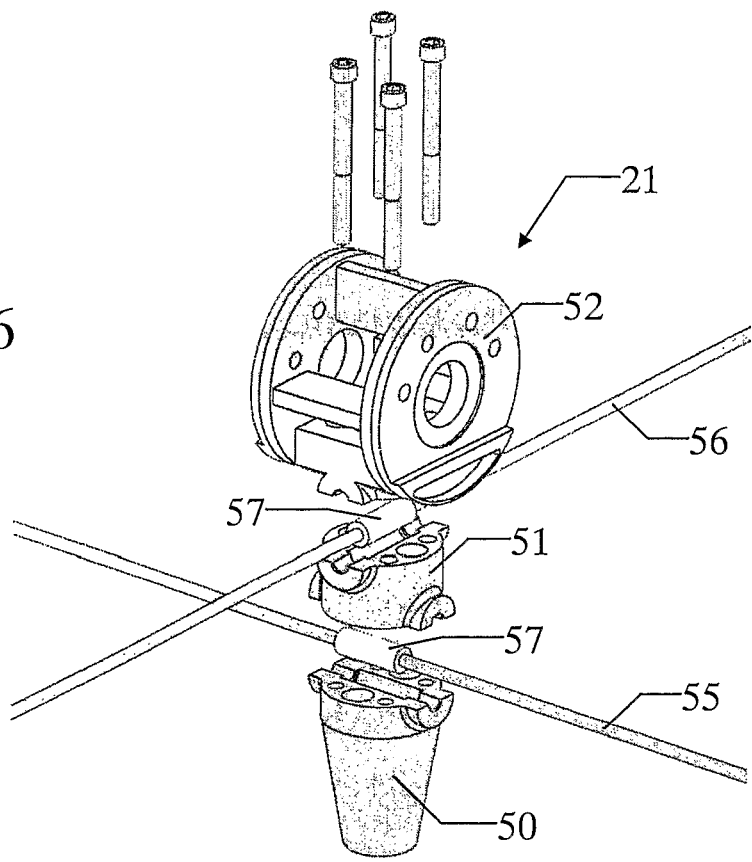
FIG. 6 is an exploded view of a detail of the system for connecting the cables of the solar energy collection system, according to the present invention.
Figure 7:
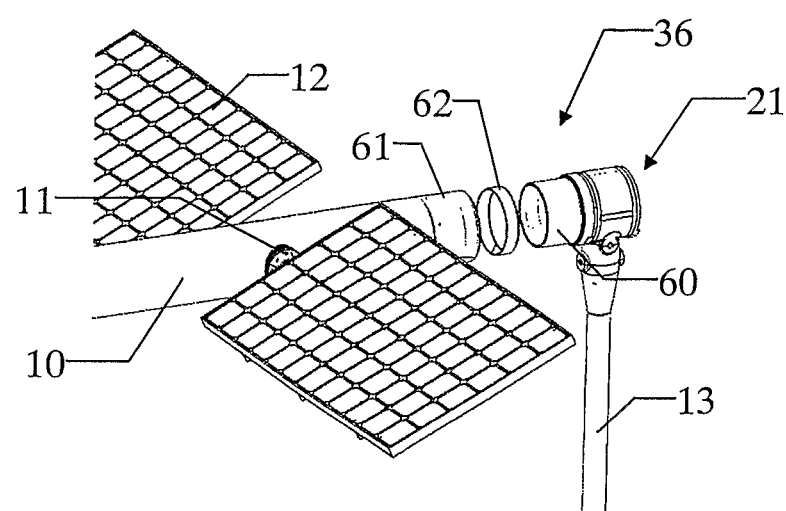
FIG. 7 is an exploded view of a detail of the slidable expansion joint of the solar energy collection system, according to the present invention.
Figure 8:
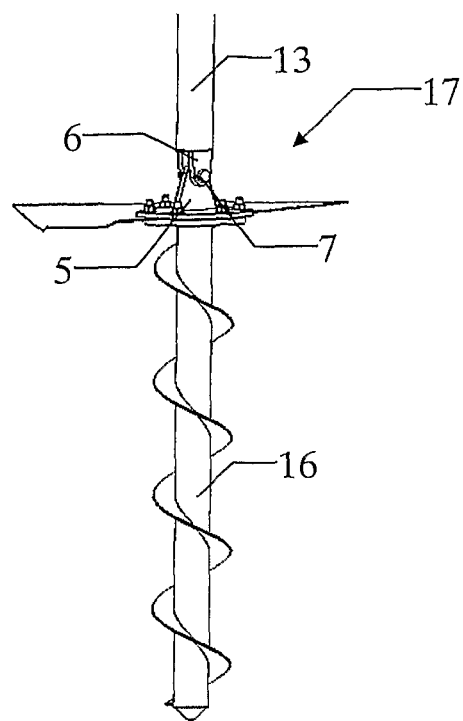
FIGS. 8 and 9 show two embodiments of the structures for fixing the support posts and ties to the ground, according to the present invention.
Figure 9:
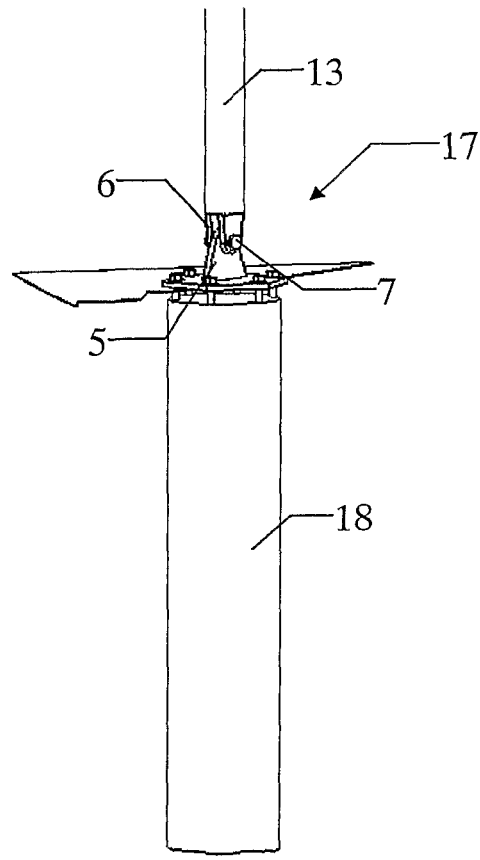

With reference to the accompanying figures, the solar energy collection system according to the present invention comprises a plurality of solar trackers, having a plurality of solar panels, supported by a tenso-structure.

Each solar tracker comprises a horizontal load-bearing main tube 10 able to rotate about its axis, and to which are connected a plurality of secondary tubes 11 fixed perpendicularly to the main tube 10 and rotatable about their axis on bearings.

The main tube 10 is made mainly of extruded aluminium (low weight), is 12 m long and is internally hollow with a diameter of about 30-40 cm.

The secondary tubes 11 terminate on both sides of the main tube in flanges enabling the panels to be mounted by screw means and demounted.

A panel 12 is fixed to each secondary tube 11 to enable solar energy to be captured.

The main tube 10 is secured at its ends to two support posts 13 maintained in position by a network of ties.

The support posts are iron posts with a diameter of about 10-12 cm and a thickness of 3-4 mm.

For two aligned main tubes 10, two lateral support poles 13 and one intermediate support pole 13 are required.

The support poles 13 and ties are fixed into the ground 15 via a foundation and preferably by means of screw shafts 16.

The support posts 13 are fixed to the screw shafts 16 by a coupling point 17 positioned at their base.

The foundation advantageously consists of a screw shaft 16 driven into the ground or of a micro-pile formed on site, substantially a concrete cylinder formed at a certain depth in the ground.

The screw shaft 16 and the connection element are provided at their top with a coupling point 17, comprising a bored vertical plate 5. The support posts 13 terminate at their base with two spaced-apart bored vertical plates arranged to cooperate with the plate 5.

A pin 7 is inserted into the side-by-side holes to enable the support posts 13 to rotate about an axis parallel to the axis of the main tube 10.

A fixing element (or connection crown) 21, holed internally (for possible passage of electric cables into its interior) is fixed to the upper end of the support posts 13. Laterally thereto two flanges are present comprising several holes, required for screws which fix the connection crown to the main tube 10.

One flange 100 is used for fixing (supporting) the connection crown 21 to a main tube. the other flange 110, distant from the first, being used to fix (support) the connection crown 21 to another adjacent main tube 10 in line with the first main tube 10. In this manner at continuous row of main tubes 10 can be formed.

The fixing element 21 presents a lower portion 50 for its fixing to the posts 13, an intermediate portion 51 and an upper portion 52 including the above flanges.

Between the lower portion 50 and the intermediate portion 51 a seat is provided for a cable 55 disposed perpendicular to the axis of the main tube 10.

Between the intermediate portion 51 and the upper portion 52 a seat is provided for a cable 56 disposed in the same direction as the axis of the main tube 10.

Hence, the fixing element 21 is formed such as to enable it to be mounted on the head of the post 13 by passing through it two mutually perpendicular metal cables 55 and 56.

Essentially, the two taut metal cables 55 and 56 are embedded in the constituent components of the connection crown 21.

Previously, the cables are fitted with locking sleeves 57 (which increase the cable diameter), which are crimped onto the cable at distances apart which are very precisely predetermined in the factory, in accordance with design dimensions. In this manner these sleeves also form a sort of assembly template because the sleeve positioning already establishes with great precision the distance between the heads of the main tubes 10. Hence the cable is used not only to support the posts in position but to maintain them in position at the correct distances with great accuracy, so avoiding the need to adjust the distance between the tube heads, which instead is necessary with traditional systems consisting of many tie pieces ringed to each head. This system reduces costs, simplifies head mounting and accelerates plant assembly, ensuring great precision. In particular, the aforesaid relates to the cables for connecting the parallel tubes 10 together and also to a cable which extends aligned, slightly below the main tube 10.

For a collection system of 6 main tubes by 6 rows, steel cables were used having a diameter of 18 mm.

At one end of the main tube 10 there is a motor 24, suitably fixed to the tube, its gearwheel 25 engaging in a toothed semicircle 26 (or gearwheel) fixed to the fixing element 21. This motor 24 rotates the main tube 10 about its axis.

More internal in the main tube 10 there is a motor 30 operating a rack which rotates a gearwheel 32 rigid with a shaft 33 fixed to the solar trackers 11. This structure is repeated for each pair of solar trackers fixed to a main tube 10.

As an alternative to the aforedescribed solution, the gearwheels can be replaced by a rack with pulleys and cables (or chains).

The motors 24 and 30 typically consist of a stepping electric motor connected to an irreversible step-down gear, they dragging the linkages in the two directions of movement (typically ±90° about the rest state) with variable velocities set by a control system. The irreversibility is provided for example by worm reducers. The electric motors used develop a considerable torque at very low r.p.m. when tracking the sun, but are also used at higher r.p.m. for rapidly positioning the axes. Specifically, motors were used with a force of around 1/1.5 Newton.

The stepping motor uses electronically controlled positioning by defining the number of steps to be undergone.

The motor carries out this repositioning with absolute precision provided that the torque developed by it at each advancement step is greater than the resistant torque.

Preferably, for rotating the tubes sliding bearings are used consisting of plastic bands interposed between the tube and the two fixed end parts coupled to the connection crowns. These bearings are free from maintenance within the life of the machine but provide more friction than a ball bearing. Hence the torques due both to the bearing friction and to possible unbalance caused by wind forces pressing on the panels have to be overcome.

To obtain sufficient torque, the irreversible step-down gear has to be coupled to one or more mechanical r.p.m. reducers.

This system of coupling the irreversible step-down gear also acts as a brake. Once the motor has positioned the axes, it maintains the position even against forces which the tracker undergoes from outside.

Advantageously an open loop motor control system is used.

For diagnostic purposes, a control system periodically verifies the inclination of the axes using an inclination sensor. This is a periodic control only for safety purposes which also serves initially to find the original position of the axes on installing the tracker.

At another end of the main tube 10 a slidable expansion joint 36 is positioned, structured as a telescopic element, to enable it to expand.

One telescopic element 60 is fixed to the flange of the connection crown 21 and another telescopic element 61 is fixed to the main tube 10. The two telescopic elements are separated by a polytetrafluoroethylene (PTFE) ring. During assembly the slidable end is fixed to the support structure such as to enable maximum expansion and maximum contraction.

The expansion joint 36 enables the main tube 10 to lengthen by thermal expansion without pressing on the support points, i.e. the connection crowns or, vice versa, it enables the connection crowns to have a certain elasticity of movement within the fixing points, in this manner compensating the cable elasticity.

The fixing elements 21 are to be used if the support posts 13 are positioned along a straight line. If the posts are to follow a road or a river, and hence cannot be fixed along a straight line, two interlaced structures 45 can be used, positioned along different directions. The structures 45 comprise rings 46 which are mounted on the post 13 and about which they can rotate. Each structure 45 comprises two seats 22, in which the screws for fixing the main tube 10 are positioned.

As the main tube 10 is load-bearing, it supports its own weight, the weight of the internal linkages, the weight of the rotating shafts to which the panels are secured, and the weight of the panels. The mechanical characteristics of the tube are such as to resist the wind force and the weight of snow, independently of the position of the axes.

The main tube 10 also contains the electrical connection cables for the various panels 12 (or the fluid transport tubes) for carrying to the outside the current generated by them, or the heat captured by them.

The control system for the tracker, integrated into the main tube 10, is able to maintain the panels constantly orientated towards the sun so that the sun is perpendicular to the capturing surface of the panels, by known methods deriving from celestial forecasting using an algorithm based on date and time, the geographical installation coordinates, and the orientation of the main axis parallel to the ground, with respect to north.

The control system can also: quickly reposition the panels in a particular position in case of need (hailstones, excessive wind, etc.), maintain the system in movement to prevent ice formation, detect any faults in the drive members, sense panel detachment, carry out environmental measurements of various kinds.

Each main tube 10 comprises a control system integrated into the tube itself, and a receiver-transmitter for communication with main tubes 10 close by.

The control system is provided with a receiver-transmitter preferably of ZigBee type by which it is able to communicate within a network consisting of several solar trackers and one or more control centres. Each receiver-transmitter forms a node within the network able to communicate its own messages directly or to retransmit messages received from near nodes. The radius of action of the receiver-transmitter must be such as to be able to communicate not only with the closest receiver-transmitters but, in case of a fault in one or more of them, to be able to communicate with more distant receiver-transmitters. For this purpose, the radius of action of each receiver-transmitter must be equal at least to four times the length of the main tube 10.

By way of the network, each main tube 10 is connected to the control centre from which it can periodically receive the exact synchronism of the internal clock. The integrated control system, knowing the exact time, the geographical position (latitude and longitude) and the direction of the main tracker axis relative to north, is able to calculate moment by moment the absolute position of the sun and to consequently regulate the mechanical members.

The control centre is provided with a meteorological control unit and in case of need communicates any emergency conditions to all trackers. For example in the case of strong wind, it forces the panels into a position such as to expose the least surface to the wind force. In the case of rain it forces the panels into a vertical position to enable the entire underlying ground to receive the rain.

In the case of low temperature it maintains the mechanical members in continuous movement to prevent ice formation on the joints. During maintenance it suitably positions the panels such that they do not hinder circulation of the underlying vehicles. Cyclically it is able to contact each individual tracker to verify its presence and operability.

Each tracker is able to transmit diagnostic warnings or measurements to the alarm centre.

Each tracker is provided with a flashing light and intermittent acoustic warning device which are activated in the following cases: to warn persons surrounding the tracker that the mechanical members are to undergo rapid movement, and to indicate the tracker position to responsible staff in the case of alarm (for example due to panel detachment by theft).

Normally several main tubes 10 are used disposed along parallel rows suitably spaced apart to prevent mutual interference of shadows between the panels at dawn and at dusk. In this configuration each post serves to support one end of two adjacent main tubes. The height of the support posts must be such as to enable the panels to be rotated to their maximum limit close to vertical. To this minimum height further space can be added depending on the locality of installation.

A typical installation of this type of plant is for example along a roadway, along a railroad, along an embankment or along a canal. In this case the support structure will consist of a linear assembly of posts along the edge of the road or canal of height such as to enable persons and vehicles to pass. If suitably spaced apart, existing post assemblies can be used such as rows of lamp-posts, overhead telephone lines or low voltage electrical lines.

In the case of installation on agricultural land as a regular rectangular or square grid in the form of long parallel rows of trackers, lengthy strips of cultivatable land are formed, the width of which depends on the length of the trackers and the distance between the parallel rows. The height of the post arrangement will depend both on the vehicles used and on the crops.

A typical case could be the use of trackers having main tubes 10 of length 12 m, in parallel rows spaced 9 m apart with posts of height 5 comprising five panels on one end and five panels on the other end of the main tube 10 in positions opposite the first to avoid balancing problems, these being of size 1 m×2 m, spaced about 1.5 m apart. With this configuration there are no limits to the type of crops or to the size of the agricultural machines able to pass below the trackers.

Moreover by mounting the installation on posts the trackers and the electrical part are maintained far from the ground, so increasing the safety level for personnel and enabling floodable or marshy land to be used.

The structure comprising posts with ties can be achieved with only limited foundation work by using micro-piles or screw piles to be inserted into the ground, hence avoiding the imposing reinforced concrete foundation work required by traditional trackers situated on the ground.

When a row of posts has been laid and the cable which connects the row of posts together transversely has been passed through the tops of the posts (the cable then being blocked to the ground at the beginning and end of the row of posts), this solution enables the poles to be raised from the ground by rotating them very easily on the pivots at the base of the posts using a simple lever system. The joint between the post and the foundation consists of a pivot which can be withdrawn to enable a post to be replaced and which, at the end of the plant's life, enables the structure to be dismantled and the foundation easily removed from the ground. The foundation is coupled at the fixed ring at its end to a lifting system which withdraws it vertically from the ground.

The tracker is balanced along all the movement axes and hence requires minimum force for its movement. This results in low energy consumption and lighter mechanical members.

All the mechanical members are contained within the tubular structure 10 protected from atmospheric agents, with increased operational life.

The suspended installation maintains the moving members, the electrical system and any fluid transport network out of reach, with increased plant safety.

In this respect, the electrical system and the possible fluid transport network are coupled to the suspended cables, with the exception of the descent line.

The capturing panels are spaced apart and produce shadows which move along the ground, such that the underlying land receives direct sunlight at all points. Ground shading is very limited and discontinuous, with minimum interference to underlying crop growth.

Being suspended on posts, the installation enables agricultural vehicles to operate by passing below the trackers.

The support structure in the form of posts and ties does not require reinforced concrete foundation work, which makes a considerable impact on the underlying ground and is difficult to remove at the end of the plant operating life.

The electrical connection system between the photovoltaic panels (or the pipes for the fluids circulating through the capitation devices) is previously cabled within the tubular structure, so extremely simplifying installation. The photovoltaic panels or the capitation devices are assembled with their support structure containing the pick-up sensors and are factory tested. They are connected and fixed to the tracker by quick connectors only in the final installation stage prior to testing and centralizing the plant, leading to greater security against theft on site.

If the trackers are provided with environmental sensors, a plant consisting of several trackers constitutes a capillary environmental monitoring network.

The materials used and the dimensions can be chosen at will according to requirements and to the state of the art.

The solar tracker conceived in this manner is susceptible to numerous modifications and variants, all falling within the scope of the inventive concept; moreover all details can be replaced by technically equivalent elements.

The invention claimed is:

1. A solar energy collection system, comprising:
    a plurality of solar trackers, each said solar tracker comprising a main horizontal load-bearing tube (10) rotatable about its axis and a further main horizontal load-bearing tube (10) rotatable about its axis with a plurality of secondary tubes (11) extending perpendicular from said main tube (10) and said further main tube (10), each secondary tube (11) rotatable about its axis, and to each of said secondary tubes there being fixed a panel (12) able to capture solar energy;
    a support structure comprising a plurality of posts (13), each positioned vertically, a first and a second pair of said plurality of posts (13) each comprising a connection element (21) positioned at their tops, said connection elements (21) securing said main tube (10) at a first end and said further main tube (10) at a first end, and an intermediate post comprising a connection element (21), said connection element (21) comprising a first lateral portion fixing said main tube (10) at a second end opposite the first end and a second lateral portion fixing the further main tube (10) at a second end opposite the first end to one another to form a connected pair of a main tube (10) and a further main tube (10),
    each of said main tube (10) and said further main tube (10) comprising a slidable joint (60, 61, 62) enabling it to expand, said slidable joint (60, 61, 62) being fixed at one end (61) to said main tube (10) or said further main tube (10) and at the other end (60) to said connection elements (21);
    said first post (13) and said second post (13) each comprising a coupling point (17) at their base, said coupling point (17) comprising a first holed plate (6) fixed to each of said first post (13) and said second post (13);
    said coupling point (17) further comprising a screw shaft (16, 18) fixed driven into a ground below the system; a second holed plate (5) fixed to said screw shaft (16, 18); a pin (7) being inserted through the holes of said holed plates (5, 6);
    each of said first post (13) and said second post (13) maintained in a vertical position by at least two cables (55, 56) fixed to the ground; said at least two cables (55, 56) fixed to the ground by screw shafts (16, 18);
    said connection element (21) comprising a lower portion (50), fixed to each of said first post (13) and said second post (13), an intermediate portion (51) and an upper portion (52);
    wherein between said lower portion (50) and said intermediate portion (51) a first seat receives a first cable (55) disposed perpendicular to said main tube (10);
    wherein between said intermediate portion (51) and said upper portion (52) a second seat receives a second cable (56) disposed parallel to the axis of said main tube (10); and
    wherein said first and second cable are fitted with locking sleeves (57) crimped into the cable at predetermined distances, the sleeve positioning establishing the distance between said first post (13) and said second post (13).

2. A system as claimed in claim 1, further comprising a plurality of said main tubes (10) and said further main tubes (10), each pair of which are aligned and fixed to two of the plurality of posts (13) and the intermediate post.

3. A system as claimed in claim 1, wherein only two cables (55, 56) are fixed to each connection element (21).

4. A system as claimed in claim 1, wherein said main tube (10) comprises a motor (24) fixed to the tube itself, and having a gearwheel (25) which engages a toothed wheel (26) fixed to said first post (13).

5. A system as claimed in claim 1, wherein said main tube (10) comprises a motor (30) fixed thereto to drive a rack which rotates gearwheels (32), said gearwheels being rigid with said secondary tubes (11).

6. A system as claimed in claim 1, further comprising a plurality of main tubes (10); each of said plurality of main tubes (10) comprising a receiver-transmitter able to communicate with other main tubes (10).

7. A system as claimed in claim 1, wherein said first post (13) and said second post (13) have a height greater than 3 meters.

8. A system as claimed in claim 1, wherein said first post (13) and said second post (13) have a height greater than 4 meters.

* * * * *